Patented Apr. 29, 1930

1,756,702

UNITED STATES PATENT OFFICE

JOSEPH L. ROSENFIELD, OF ALAMEDA, CALIFORNIA

NUT-MEAT PRODUCT AND PROCESS OF PRODUCING SAME

No Drawing.  Application filed March 30, 1925. Serial No. 19,279.

This invention relates primarily to the treatment of the edible portions of nuts, for the purpose of producing marketable food substances. It will be described in connection with the treatment of peanuts and the production of so-called peanut butter or analogous substances, but it is to be understood that the example thus selected is to be taken only as an illustration and not as a limitation of the application of the invention.

I have discovered that the desirable nutty flavor of peanuts is developed at the time of roasting and that this roasting step or treatment actually converts the starches of the peanuts into invert sugars. I have further discovered that certain other invert sugars, foreign to those developed in the peanut by roasting, particularly those invert sugars contained in malt syrup, dextrine, diamalt, malt flour, caramel malt flour, malted milk, etc., are more or less closely related. I would say under ordinary operating conditions the usual roasting step for the peanuts is insufficient to develop the required invert sugar content to realize the desired results contemplated as an outcome of my discoveries. This can be accounted for by the fact that the physical condition of the germ of the peanut is unresponsive to the effect of the heat except to a limited extent. However, since the conditions are present in the main and since such invert sugars as are present are closely related to malt, I propose to malt the peanuts before they are roasted or even operated on in any way in contemplating the manufacture of peanut butter. This particular step forms the basic principle of one feature of my invention. By thus malting the peanuts I effect a change in the character of the nut and convert it into a food which contains vitamin to a very high degree. Naturally this change in the character of the nut would carry into the finished product. It means that peanut butter made in accordance with my process represents a concentrated and nutritious food. It also means that inasmuch as the characteristic flavor of peanut butter is invert sugar the increased flavoring agent developed by my process results in a product with an unusually abundant rich nutty flavor.

In putting the process into practical use, I prefer to malt the peanuts so as to sprout the germ of the same and when the germination has progressed to the desired degree the action may be stopped by either kiln drying or roasting. If the peanuts are roasted, the next step is blanching, and then the nuts are ground and salted to taste. Except where unusual steps are taken in reducing the peanuts, for instance, in the procedure hereinafter disclosed, the present malting method can be incorporated with the ordinary peanut butter process, in the course of which the requisite salting may be included.

As one alternative measure the blanching step could be completed without undue loss of time after malting and before kiln drying or roasting. This particular method would materially aid blanching the peanuts and would tend to retain the sprouted germs of the nuts intact. At the same time the roasting or kiln drying should be completed almost immediately after blanching to arrest germination as the peanuts would be damp and thus still under the action of the malting reaction.

Ordinarily, in making peanut butter, the germs of the peanuts must be removed as the chemical constituent of the oil in the germ impairs the keeping quality of the peanut butter. In view of the chemical changes effected in the peanuts, including the germ, due to malting, it will not be necessary to remove the sprout which, of course, is an advantage.

Ordinarily I would not recommend blanching before roasting as to do so might allow the oil in the peanuts to come in contact with the heated metal of the roasters, thereby carbonizing and allowing a certain amount of carbon or black substance to appear. As a matter of fact, the skin of the peanuts acts as a protecting coat to this oil, and unless measures were taken to avoid this situation it would be desirable in the majority of cases to roast or otherwise heat treat the peanuts before blanching.

Meat of peanuts or other nuts treated in accordance with the present invention constitutes a characteristically new product, namely, a nut meat or a nut meat product containing an increment of sugar substance over and above that originally existing in the nut even after roasting, this increase of sugar being due to the malting or germinating process which changes a portion of the starchy constituent of the nut into maltose, which is of a sugary nature; and since malting is followed by roasting, the sugary increment developed by the germinating or saccharifying step is caramelized or rendered invert. Furthermore, the germ of the nut which in previous practice has generally been eliminated as an undesirable ingredient, being an obstacle to preservation, is preferably retained in the nut meat, with the result of lending not only its bulk but additional nutritive quality to the mass; and this is rendered practicable because in the germinating process, the enzyme, which is the active fermenting principle, after having acted on the starch in the germinating process, is rendered neutral or sterilized by the heat of roasting or equivalent step in the process.

The subject-matter of the herein described process of malting nut kernels, with consequent saccharification, neutralization, and caramelizing, constitutes a particularly desirable procedure in the production of peanut butter in accordance with the process described in Reissue Patent No. 15,918, issued to me September 23, 1924, according to which the meat of the nuts is treated to cause withdrawal of a portion of its original oily constituent, and the resultant mass or cake is thereafter mixed with the hydrogenated edible oil, either a portion of the original oil or another edible oil or fat. The several steps in such a process are malting the nuts in the manner and with the effects hereinbefore pointed out; extracting the desired percentage of oil, with or without previous comminution of the nut meat; hydrogenating the oil, incident to which is the application of ample heat to sterilize; toasting the nut cake which fully sterilizes that portion of the nut and caramelizes or inverts the sugar; and, finally, incorporating the nut meat with hydrogenated oil.

The process is also applicable to various modifications of the peanut butter process of my aforesaid reissue Letters Patent, for instance, the modification which consists in substituting for the extracted oil or portions thereof, other forms of edible fat, for instance, cocoanut butter; and combining my present process with such other peanut butter processes of my invention, involves the novelty of changing the nutritive and palatable qualities of the ultimate product, first, by increasing the sugary content of the nut meat, and, secondly, by converting the sugary constituents by the step of roasting before the foreign edible fat is incorporated in the nut meat.

I claim:

1. The hereindescribed process of producing a nut meat product which consists in first malting the nuts, roasting the same after malting and thereafter reducing the same to a homogeneous mass.

2. The hereindescribed process of treating nuts which consists in first malting the same and thereafter roasting the nuts to arrest the action of the malting process.

3. The hereindescribed process of producing a nut meat product which consists in first malting nuts containing their germs to a predetermined degree, heat treating the same to arrest the action of the malting process, blanching the nuts after the heat treatment and thereafter reducing the nuts with their sprouted germs to a homogeneous edible mass.

4. The hereindescribed process of treating peanuts which consists in malting the peanuts containing their germs, and having their skins on, and thereafter drying the same in the presence of heat to arrest the action of the malting process; heating being continued until the nuts together with their germs are roasted, and the nuts and sprouted germs being reduced to a homogeneous edible mass.

5. The hereindescribed process of producing a nut meat product which consists in malting the nuts, arresting the malting process after it has progressed to a desired degree, the arrest of malting being effected by heat, and the heating being continued until the nuts and their sprouted germs are roasted, blanching the nuts, and finally reducing the nuts and their sprouted germs to a homogeneous edible mass.

6. A nut meat product comprising a homogeneous mass of roasted malted nuts; the nuts together with their sprouted germs being comminuted into a homogeneous edible mass.

7. A nut meat product comprising a homogeneous mass of comminuted roasted sprouted nuts in which the invert sugar content developed by roasting is fortified by additional invert sugar in the form of malted matter from another source.

8. Nut meat having the germinating portion of the nut incorporated therein but in a roasted state which renders it innocuous to the keeping quality of the meat.

9. Nut meat having the germinating portion of the meat incorporated in it, and having its diastasic enzyme neutralized by roasting.

Signed at Chicago, Illinois, this 28th day of March, 1924.

JOSEPH L. ROSENFIELD.